(12) United States Patent
Trachewsky

(10) Patent No.: US 8,295,385 B2
(45) Date of Patent: *Oct. 23, 2012

(54) INITIATION OF A MIMO COMMUNICATION

(75) Inventor: Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,558

(22) Filed: Oct. 24, 2011

(65) Prior Publication Data

US 2012/0039324 A1 Feb. 16, 2012

Related U.S. Application Data

(63) Continuation of application No. 11/132,516, filed on May 19, 2005, now Pat. No. 8,068,550.

(60) Provisional application No. 60/648,207, filed on Jan. 28, 2005.

(51) Int. Cl.
*H04B 7/02* (2006.01)

(52) U.S. Cl. ........ 375/267; 375/347; 375/375; 375/299; 375/355

(58) Field of Classification Search ................ 375/347, 375/267, 375, 299, 355
See application file for complete search history.

(56) References Cited

U.S. PATENT DOCUMENTS

| 8,068,550 | B2 * | 11/2011 | Trachewsky | 375/267 |
|---|---|---|---|---|
| 2003/0003863 | A1 * | 1/2003 | Thielecke et al. | 455/39 |
| 2005/0124340 | A1 * | 6/2005 | Giesberts et al. | 455/432.1 |
| 2005/0135284 | A1 * | 6/2005 | Nanda et al. | 370/294 |
| 2005/0135295 | A1 * | 6/2005 | Walton et al. | 370/328 |
| 2005/0141407 | A1 * | 6/2005 | Sandhu | 370/203 |
| 2005/0288062 | A1 * | 12/2005 | Hammerschmidt et al. | 455/562.1 |
| 2006/0034178 | A1 * | 2/2006 | Yang et al. | 370/236 |
| 2006/0034244 | A1 * | 2/2006 | Huang et al. | 370/344 |
| 2006/0056316 | A1 * | 3/2006 | Chandra et al. | 370/254 |

* cited by examiner

*Primary Examiner* — Kenneth Lam
(74) *Attorney, Agent, or Firm* — Garlick & Markison; Timothy W. Markison; Jessica W. Smith

(57) ABSTRACT

The present invention provides a method and apparatus for initiating a multiple input multiple output (MIMO) communication. The method and apparatus includes processing that begins by transmitting a frame formatted in accordance with a default MIMO active transmitter-receiver antenna configuration to a target receiver. The processing continues by receiving at least one response frame from the target receiver. The processing continues by determining a number of receiver antennas of the target receiver from the at least one response frame.

20 Claims, 4 Drawing Sheets

INITIATION OF A MIMO COMMUNICATION

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility patent application Ser. No. 11/132,516, entitled "INITIATION OF A MIMO COMMUNICATION," filed May 19, 2005, pending, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Patent Application Ser. No. 60/648,207, entitled "INITIATION OF A MIMO COMMUNICATION,", filed Jan. 28, 2005, now expired.

BACKGROUND OF THE INVENTION

1. Technical Field of the Invention

This invention relates generally to wireless communication systems and more particularly to multiple input multiple output (MIMO) communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

An issue with MIMO wireless communications is determining the number of transmit antennas and the number of receive antennas to be used in a communication. For instance, at the commencement of a MIMO wireless communication, the transmitting device knows the number of antennas it includes, but does not know the number of antennas of the targeted receiving devices. To provide efficient MIMO wireless communications, the transmitting device needs to economically determine the number of transmit antennas and receive antennas that will be used for a communication.

Therefore, a need exists for a method and apparatus for initiating a multiple input multiple output (MIMO) wireless communication that includes selecting transmit antennas for use in a MIMO communication.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
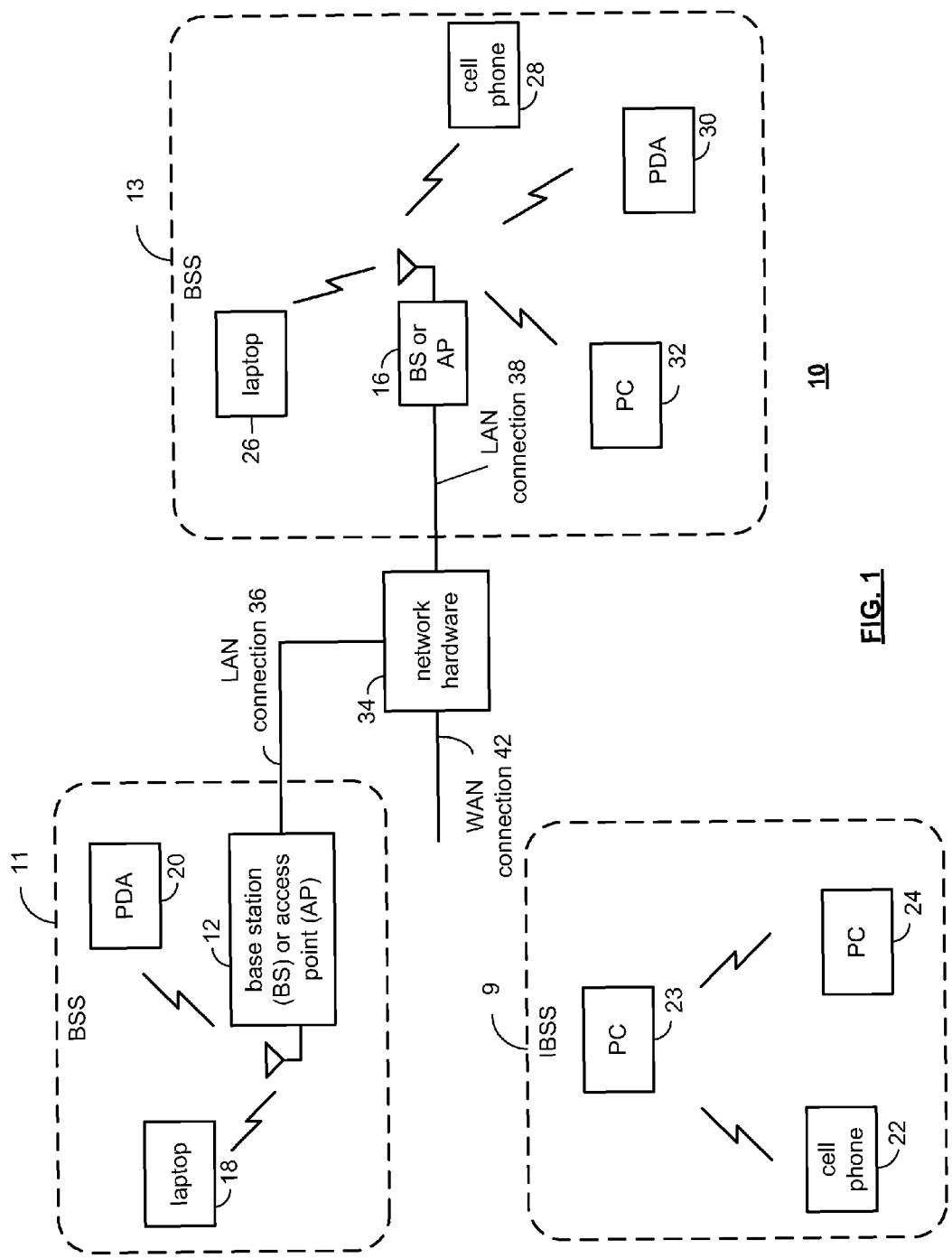
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
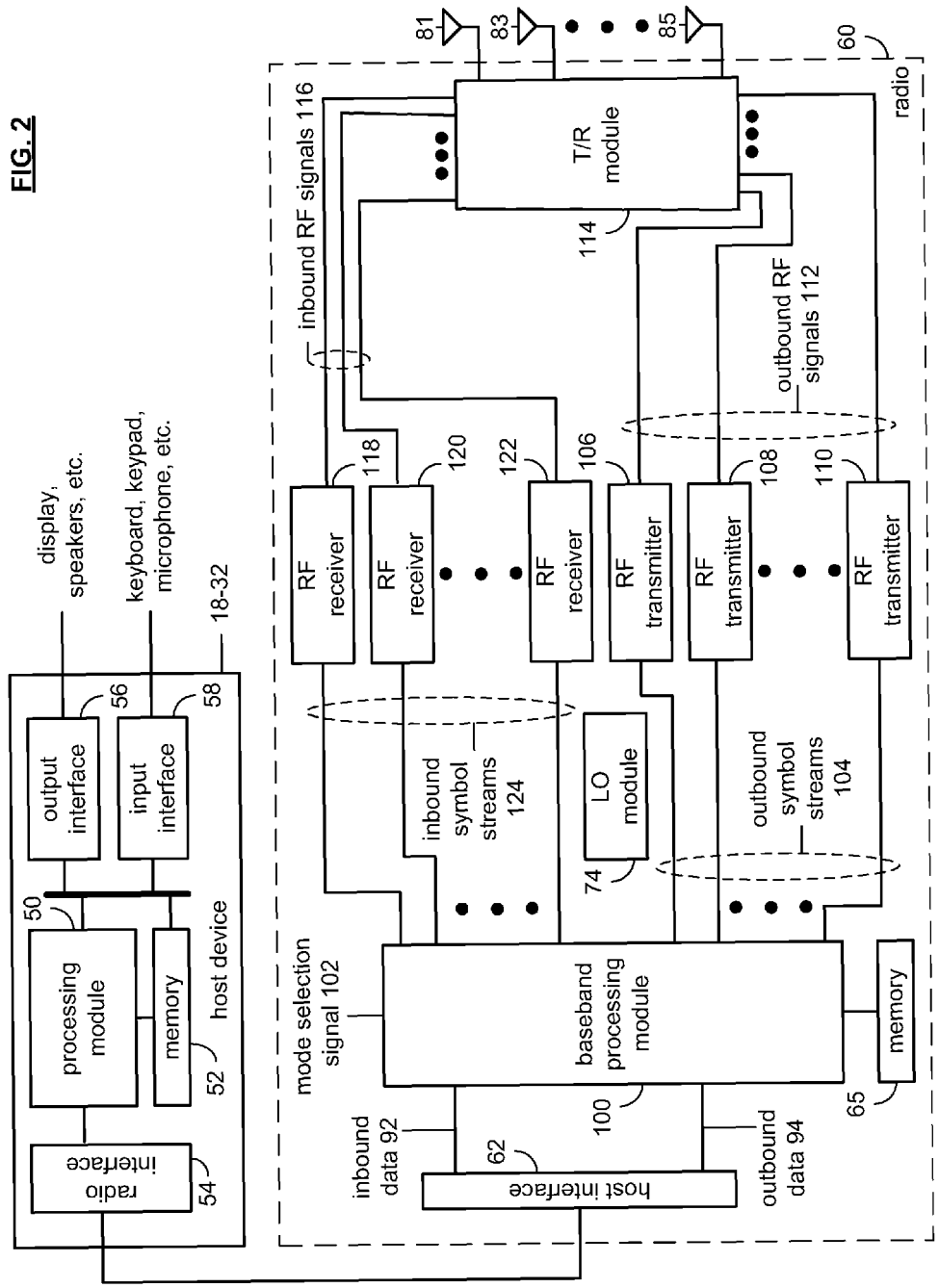
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, digital baseband to IF conversion, multiple input multiple output (MIMO) communication initiation as further described with reference to FIGS. 3 and 4, and/or transmit antenna selection as further described with reference to FIG. 5. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. Each of the RF receivers 118-122 includes an RF bandpass filter, a low noise amplifier, programmable gain amplifier, a frequency down conversion module, an analog filtering module, an analog to digital conversion module, and a digital filter and down sampling module. In operation, the RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 3:
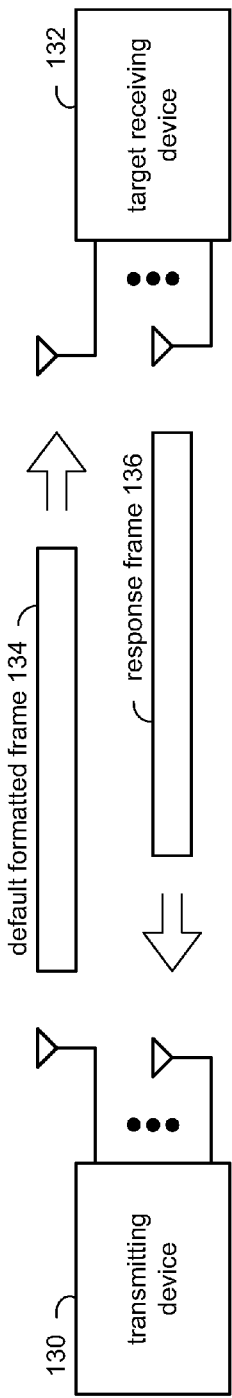
FIG. 3 is a schematic block diagram of a transmitting device initiating a MIMO wireless communication with a target receiving device in accordance with the present invention.

FIG. 3 is a schematic block diagram of a transmitting device 130 (e.g., one of the plurality of wireless communication devices 18-32 of FIG. 1) transmitting a default formatted frame 134 to a target receiving device 132 (e.g., another one of the plurality of wireless communication devices 18-32 of FIG. 1). The default formatted frame 134 may be transmitted directly to the targeted receiving device 132 and/or via an access point.

The default formatted frame 134 may be constructed in a variety of ways to initiate a MIMO communication with the targeted receiving device 132. For example, the default formatted frame 134 may be based on an assumed number of antennas of the targeted receiving device (e.g., 1, 2, 3, or 4 antennas) and then constructed based space time encoding, space frequency encoding, beamforming, or a fixed M by N configuration.

When the default formatted frame 134 is constructed in accordance with space time encoding, the frame 134 includes a header section that comprises a short training sequence (STS), a long training sequence (LTS), a signal field, and a service field. The STS, LTS, and signal field are at a lowest rate (or some other default rate) based on the number of assumed antennas of the targeted receiving device 132. Within the signal and/or service field, the transmitting device 130 includes an indication of the number of available transmit antennas.

In response to the default formatted frame 134, the targeted receiving device 132 generates and subsequently transmits a response frame 136. The response frame 136 may be an acknowledgement of receipt of the default formatted frame 134 that includes an indication of the number of its antennas. The indication of the number of receiving device antennas may include the number of antennas, the configuration of the antennas, the type of antennas, and/or any other information regarding the antennas that would facilitate determining a frame format (e.g., number of transmit antennas, data rate, modulation, number of receiving antennas, frequency band, and/or any other information pertaining to a particular mode of operation) for an efficient MIMO communication. In general, an efficient MIMO communication is one that minimizes the use an RF channel or channels but still reliably conveys data between the devices 130 and 132. For example, the devices 130 and 132 will typically establish the MIMO communication using the largest channel bandwidth (e.g., 20 MHz channel or 40 MHz channel), the highest data rate (e.g., 54 Mbps to approximately 500 Mbps), the highest modulation (e.g., 16 QAM or 64 QAM), etc. that the devices and allocated RF channel(s) can support.

Alternatively, the default formatted frame 134 may include a probe request within the signal and/or service field to an access point, where the probe request is requesting the targeted receiving device to response with an indication of the number of its antennas. In response to the probe request, the targeted receiving device 132, which may be the access point or another wireless communication device, provides the response frame 136, which includes an indication of the receiving device's antenna configuration, via the access point to the transmitting device 130.

The transmitting device 130 interprets the response frame 136 to determine the receiver's number of antennas and may also determine other antenna configuration information regarding the receiver's antennas. From this information, the transmitting device 130 determines the number of antennas it will use to provide an efficient MIMO communication. In one embodiment, the transmitting device 130 will select a number of transmitting antennas to match the number of receiving antennas. In another embodiment, the transmitting device 130 will select a greater number of transmitting antennas than receiving antennas for asymmetrical MIMO communication. The selection of which transmit antennas to use will be described with reference to FIG. 5.

Figure 4:
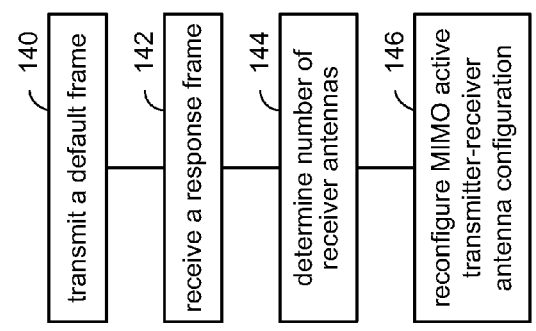
FIG. 4 is a logic diagram of a method for initiating a MIMO wireless communication by a transmitting device in accordance with the present invention.

FIG. 4 is a logic diagram of a method for initiating a MIMO wireless communication by a transmitting device. The process begins at step 140 where the transmitting device transmits a frame formatted in accordance with a default MIMO active transmitter-receiver antenna configuration to a target receiver. In one embodiment, the frame formatted in accordance with the default MIMO active transmitter-receiver antenna configuration is a data frame that is based on an assumed number of receiver antennas and a corresponding number of transmit antennas. In another embodiment, the target receiver is an access point, where the frame is a probe request.

The process then proceeds to step 142 where the transmitting device receives at least one response frame from the target receiver. In one embodiment, the response frame is an acknowledgement that includes an indication of the receiver's number of antennas. In another embodiment, the response frame may be from an access point that includes a response to a probe request frame. In yet another embodiment, the response frame may include a signal and/or service field that includes an indication of the receiver's number of antennas.

The process then proceeds to step 144 where the transmitting device determines a number of receiver antennas of the target receiver from the at least one response frame. The process then proceeds to step 146 where the transmitting device reconfigures the MIMO active transmitter-receiver antenna configuration from the default MIMO active transmitter-receiver antenna configuration based on the at least one response frame. In one embodiment, the transmitting device reconfigures the active transmitter-receiver antenna configuration such that the number of transmit antennas equals the number of receiver antennas. In another embodiment, the transmitting device reconfigures the active transmitter-receiver antenna configuration such that the number of transmit antennas is greater than the number of receiver antennas for asymmetric MIMO communications. Regardless of the particular reconfiguration, the transmitting device may further determine which of a plurality of transmitter antennas to include in the reconfigured MIMO active transmitter-receiver antenna configuration based on at least one of supported date rate and a predetermined grouping of the plurality of transmitter antennas.

Figure 5:
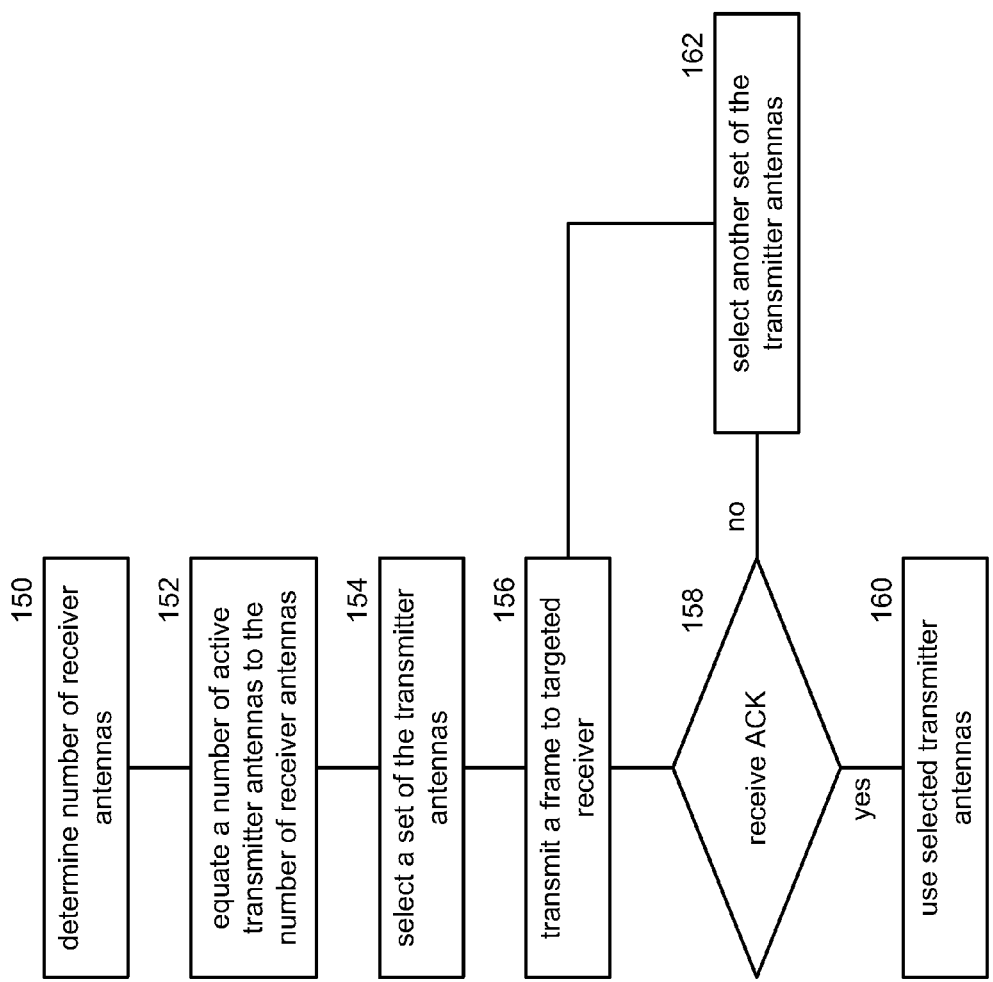
FIG. 5 is a logic diagram of a method for selecting transmit antennas for a MIMO communication by a transmitting device in accordance with the present invention.

FIG. 5 is a logic diagram of a method for selecting transmit antennas for a MIMO communication by a transmitting device. The process begins at step 150 where the transmitting device determines a number of receiver antennas of a targeted receiver, wherein the number of receiver antennas is less than a number of transmitter antennas. The process then proceeds to step 152 where the transmitting device equates a number of active transmitter antennas to the number of receiver antennas.

The process then proceeds to step 154 where the transmitting device selects a set of the transmitter antennas based on the number of active transmitter antennas to produce a selected set of transmitter antennas. In one embodiment, the transmitting device selects the set of the transmitter antennas by selecting the set of the transmitter antennas from a list of predetermined groupings of the plurality of transmitter antennas, wherein a number of the transmitter antennas in a grouping corresponds to the number of receive antennas.

The process then proceeds to step 156 where the transmitting device transmits a frame to the targeted receiver via the selected set of transmitter antennas. In one embodiment, the frame has a given data rate, which may be set from the lowest data rate for the antenna configuration to the highest data rate for the antenna configuration. For example, the data rate may be set at the highest data rate or at some mid point data rate.

The process then proceeds to step 158 where the transmitting device determines whether an acknowledgement has been received for the frame within a given time period or within a given number of retransmissions of the frame. If not, the process proceeds to step 162 where the transmitting device selects another set of the transmitter antennas when an acknowledgement of receipt of the frame is not received from the targeted receiver. If the acknowledgement is received, the process proceeds to step 160 where the transmitting device uses the selected transmitter antennas. As an alternative to step 160, the transmitting device may increase the data rate and varying the transmit antenna configuration to determine if a different transmit antenna configuration will provide a higher data rate.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for initiating a MIMO communication and selecting transmitter antennas associated therewith. As one of average skill in the art will appreciate, other embodiments may be derived from the teachings of the present invention without deviating from the scope of the claims.

What is claimed is:

1. A method for establishing a multiple input multiple output (MIMO) communication by a transmitter, the method comprises:
   generating a first frame, wherein the first frame is formatted in accordance with a first particular mode of operation in compliance with an IEEE 802.11 standard mode of operation indicated by a mode selection signal;
   transmitting the first frame to a target receiver over a first MIMO configuration of a plurality of transmitter antennas, wherein the first MIMO configuration is indicated by the mode selection signal;
   receiving at least one response frame from the target receiver;
   generating a second frame to the target receiver, wherein the second frame is formatted in accordance with a second particular mode of operation in compliance with another IEEE 802.11 standard mode of operation indicated by the mode selection signal, wherein the second particular mode of operation indicated by a mode selection signal is based on a highest supported data rate and largest channel bandwidth supported by an allocated RF channel and the transmitter and the target receiver and wherein the second particular mode of operation indicated by the mode selection signal includes a largest channel bandwidth of 40 MHz; and
   transmitting the second frame to the target receiver over a second MIMO configuration of the plurality of transmitter antennas, wherein the second MIMO configuration is indicated by the mode selection signal.

2. The method of claim 1 wherein the mode selection signal further indicates a particular rate, a type of modulation, a code rate, a number of coded bits per subcarrier, and coded bits per OFDM symbol for the second particular mode of operation.

3. The method of claim 2 wherein the mode selection signal further indicates a particular channelization, a channel number and corresponding center frequency for the second particular mode of operation.

4. The method of claim 1 wherein the first particular mode of operation indicated by the mode selection signal includes a channel bandwidth of either 40 MHz or 20 MHz.

5. The method of claim 1 wherein the second particular mode of operation indicated by a mode selection signal includes a highest supported data rate in a range of 54 Mbps to approximately 500 Mbps.

6. The method of claim 5 wherein the second particular mode of operation indicated by a mode selection signal is further based on a highest modulation supported by an allocated RF channel and the transmitter and the target receiver.

7. The method of claim 1 wherein the second MIMO configuration of transmitter antennas indicated by the mode selection signal includes a number of antennas based on the highest supported data rate of the transmitter and the target receiver and a predetermined grouping of the plurality of transmitter antennas.

8. The method of claim 7 wherein the first MIMO configuration indicated by the mode selection signal is a default MIMO active transmitter-receiver antenna configuration with a plurality of transmitter antennas.

9. A transmitter for establishing a multiple input multiple output (MIMO) communication comprising:
   a plurality of transmitter antennas;
   at least one transmitter configuration module operably coupled to:
     transmit a first frame to a target receiver over a first MIMO configuration of the plurality of transmitter antennas, wherein the first frame is formatted in accordance with a first particular mode of operation in compliance with an IEEE 802.11 standard mode of operation indicated by a mode selection signal and wherein the first MIMO configuration is indicated by the mode selection signal and wherein the first particular mode of operation indicated by a mode selection signal includes a channel bandwidth of 40 MHz; and
     generate a second frame to the target receiver over a second MIMO configuration of the plurality of transmitter antennas in response to receiving at least one response frame from the target receiver, wherein the second frame is formatted in accordance with a second particular mode of operation in compliance with an IEEE 802.11 standard mode of operation, wherein the second particular mode of operation is indicated by a mode selection signal based on a highest supported data rate and largest channel bandwidth supported by the transmitter and the target receiver and wherein the second MIMO configuration is indicated by the mode selection signal and wherein the second particular mode of operation indicated by the mode selection signal includes a largest channel bandwidth of at least one of 40 MHz and 20 MHz.

10. The transmitter of claim 9 wherein the mode selection signal further indicates a particular rate, a type of modulation, a code rate, a number of coded bits per subcarrier, and coded bits per OFDM symbol for the second particular mode of operation.

11. The transmitter of claim 10 wherein the mode selection signal further indicates a particular channelization, a channel number and corresponding center frequency for the second particular mode of operation.

12. The transmitter of claim 11 wherein the second particular mode of operation indicated by the mode selection signal includes a largest channel bandwidth of 20 MHz.

13. The transmitter of claim 12 wherein the second particular mode of operation indicated by a mode selection signal includes a highest supported data rate in a range of 54 Mbps to approximately 500 Mbps.

14. The transmitter of claim 13 wherein the second particular mode of operation indicated by a mode selection signal is further based on a highest modulation supported by an allocated RF channel and the transmitter and the target receiver.

15. The transmitter of claim 9 wherein the second MIMO configuration of transmitter antennas indicated by the mode selection signal includes a number of antennas based on the highest supported data rate of the transmitter and the target receiver and a predetermined grouping of the plurality of transmitter antennas.

16. The transmitter of claim 15 wherein the first MIMO configuration indicated by the mode selection signal is a default MIMO active transmitter-receiver antenna configuration with a plurality of transmitter antennas.

17. The transmitter of claim 9, wherein the at least one response frame from the target receiver includes a number of receiver antennas of the target receiver.

18. The transmitter of claim 17, wherein the first frame is a data frame and the response frame is an acknowledgement frame.

19. The transmitter of claim 17, wherein the first frame is a probe request, the target receiver is an access point, and the response frame is a response to the probe request.

20. The transmitter of claim 9, further including:
a plurality of transmitter sections operably coupled to the plurality of transmitter antennas, wherein each of the plurality of transmitter sections converts a baseband signal into an RF signal.

* * * * *